(12) United States Patent
Patel et al.

(10) Patent No.: US 12,384,442 B2
(45) Date of Patent: Aug. 12, 2025

(54) REAL-TIME PINCH DETECTION AND PREVENTION FOR STOW PATH POWER COLUMN

(71) Applicant: STEERING SOLUTIONS IP HOLDING CORPORATION, Saginaw, MI (US)

(72) Inventors: Keyur R. Patel, Rochester, MI (US); Haiquan Li, Auburn Hills, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 259 days.

(21) Appl. No.: 17/956,988

(22) Filed: Sep. 30, 2022

(65) Prior Publication Data
US 2023/0107621 A1    Apr. 6, 2023

Related U.S. Application Data

(60) Provisional application No. 63/251,505, filed on Oct. 1, 2021.

(51) Int. Cl.
| | |
|---|---|
| *B60Q 9/00* | (2006.01) |
| *B62D 1/181* | (2006.01) |
| *B62D 1/183* | (2006.01) |
| *B62D 5/00* | (2006.01) |
| *H02P 23/14* | (2006.01) |

(52) U.S. Cl.
CPC ............... *B62D 1/181* (2013.01); *B60Q 9/00* (2013.01); *B62D 1/183* (2013.01); *B62D 5/001* (2013.01); *H02P 23/14* (2013.01)

(58) Field of Classification Search
CPC ........ B62D 1/181; B62D 1/183; B62D 5/001; B60Q 9/00; H02P 23/14
See application file for complete search history.

(56) References Cited

U.S. PATENT DOCUMENTS

| | | | |
|---|---|---|---|
| 2020/0001912 A1* | 1/2020 | Abuaita | B62D 1/181 |
| 2021/0138959 A1* | 5/2021 | Soni | G08G 1/16 |

FOREIGN PATENT DOCUMENTS

DE    102005000753 A1    8/2005

OTHER PUBLICATIONS

DE Office Action for corresponding DE Application No. 210 2022 125 280.9 mailed Mar. 18, 2025, 8 pages and English language translation, 8 pgs.

* cited by examiner

*Primary Examiner* — Adam R Mott
*Assistant Examiner* — Heather J Keniry
(74) *Attorney, Agent, or Firm* — Dickinson Wright PLLC (57) ABSTRACT

A method includes determining a current slew rate associated with a motor of the steering column, determining a speed slew rate associated with the motor, determining a current and speed slew rate threshold for the motor, and determining whether the current slew rate or the speed slew rate indicates a pinch event based on a comparison of the current slew rate, the speed slew rate, and the current and speed slew rate threshold. The method also includes, in response to a determination that at least one of the current slew rate and the speed slew rate indicates a pinch event, selectively instructing the motor to one of stop operation and reverse operation for a calibration period and, in response to the pinch event having a magnitude that is less than a pinch event threshold, selectively instructing the motor to continue operation.

17 Claims, 5 Drawing Sheets

REAL-TIME PINCH DETECTION AND PREVENTION FOR STOW PATH POWER COLUMN

CROSS-REFERENCES TO RELATED APPLICATIONS

This patent application claims priority to U.S. Provisional Patent Application Ser. No. 63/251,505, filed Oct. 1, 2021 which is incorporated herein by reference in its entirety.

TECHNICAL FIELD

This disclosure related to pinch detection and in particular to real-time pinch detection and prevention for stow path power columns.

BACKGROUND

A vehicle, such as a car, truck, sport utility vehicle, crossover, mini-van, marine craft, aircraft, all-terrain vehicle, recreational vehicle, or other suitable forms of transportation, typically includes a steering system, such as an electronic power steering (EPS) system, steer-by-wire (SbW) steering system, or other suitable steering system. The steering system of such a vehicle typically controls various aspects of vehicle steering including providing steering assist to an operator of the vehicle.

SUMMARY

This disclosure relates generally to vehicle steering systems.

An aspect of the disclosed embodiments includes a method for pinch detection of a steering column of a vehicle. The method includes determining a current slew rate associated with a motor of the steering column, determining a speed slew rate associated with the motor, determining a current and speed slew rate threshold for the motor, and determining whether at least one of the current slew rate and the speed slew rate indicates a pinch event based on a comparison of the current slew rate, the speed slew rate, and the current and speed slew rate threshold. The method also includes, in response to a determination that at least one of the current slew rate and the speed slew rate indicates a pinch event, selectively instructing the motor to one of stop operation and reverse operation for a calibration period and, in response to the pinch event having a magnitude that is less than a pinch event threshold, selectively instructing the motor to continue operation.

Another aspect of the disclosed embodiments includes a system for pinch detection of a steering column of a vehicle. The system includes a processor and a memory. The memory includes instructions that, when executed by the processor, cause the processor to: determine a current slew rate associated with a motor of the steering column; determine a speed slew rate associated with the motor; determine a current and speed slew rate threshold for the motor; determine whether at least one of the current slew rate and the speed slew rate indicates a pinch event based on a comparison of the current slew rate, the speed slew rate, and the current and speed slew rate threshold; and, in response to a determination that at least one of the current slew rate and the speed slew rate indicates a pinch event, selectively instruct the motor to one of stop operation and reverse operation for a calibration period and, in response to the pinch event having a magnitude that is less than a pinch event threshold, selectively instruct the motor to continue operation.

Another aspect of the disclosed embodiments includes an apparatus for pinch detection of a steering column of a vehicle. The apparatus includes a processor and a memory. The memory includes instructions that, when executed by the processor, cause the processor to: determine a current slew rate associated with a motor of the steering column; determine a speed slew rate associated with the motor; determine a current and speed slew rate threshold for the motor; determine whether the current slew rate or the speed slew rate indicates a pinch event based on a comparison of the current slew rate, the speed slew rate, and the current and speed slew rate threshold; in response to a determination that neither of the current slew rate and the speed slew rate indicates a pinch event, selectively instruct the motor to continue operation; and, in response to a determination that at least one of the current slew rate and the speed slew rate indicates a pinch event: selectively instruct the motor to one of stop operation and reverse operation for a calibration period; in response to the pinch event having a magnitude that is less than a pinch event threshold, selectively instruct the motor to continue operation; and, in response to a determination that the pinch event has a magnitude that is greater than the pinch event threshold, selectively instruct the motor to discontinue operation and communicating a message to an operator of the vehicle.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable forms of transportation, typically includes a steering system, such as an electronic power steering (EPS) system, steer-by-wire (SbW) steering system, or other suitable steering system. The steering system of such a vehicle typically controls various aspects of vehicle steering including providing steering assist to an operator of the vehicle.

As the automotive industry is rapidly advancing with new autonomous and comfort features, powered steering columns are becoming increasingly more integrated into automotive programs as an autonomous enabler. Improving stow and providing different column travel paths may cause a number of performances, packaging, and safety challenges. Vehicles may increasingly include features that automate stowing of a steering wheel, which may provide more autonomous enhanced driving features with higher safety.

In such systems, pinch detection may be one of the critical safety challenges (e.g., pinch detection requirements may be required for such systems, similar to automated vehicle widows having pinch detection).

Typically, such as with pinch detection of vehicle window, a window equipped with anti-pinch technology includes an electric motor fitted with a sensor (e.g., a pressure sensor or other suitable sensor), which may be configured to sense the resistive force acting against the motion of the glass of the window. When the motor detects the obstacle, the winding action stops immediately. Further, the winding action may continue in a reverse direction in order to further open the window. As a result, the window comes down, avoiding any injury to the occupant.

Additionally, or alternatively, such systems may be configured to monitor a movable element using an ultrasonic sensor, which uses the traveling distance with respect to time would detect the pinch. Alternatively, such systems may be configured to detect the pinch in the power window using at least two capacitors and sensor detection circuits provided on the surface of the top edge of the window glass sensing-based. Change of the capacitance signal transmitted to the sensor detection circuit, which generates the control signal to the power window motor, may indicate a pinch detection.

Alternatively such systems may be configured to detect pinch using the sensor which detects displacement and time counter for counting a relative time adjusting according to fluctuation in power supply. Alternatively, such systems may be configured to detect pinch using the motor physical parameters such as power supply, speed, and current measurement.

Such systems rely on sensors or external electrical and/or mechanical to detect the pinch. Using the sensor or additional electrical hardware and/or mechanical or combine increases costs and complexity in the overall system. Further, it may be difficult to package such systems in a steering system, such as a steer-by-wire steering system or electronic power steering system. Using a current threshold or stow path position change would not adequately detect the pinch since pinch and hard stop behavior are similar. Further, physical properties of powered steering columns vary widely due to temperature, usage, travel distance, power availability, travel speed, and part to part variation.

Accordingly, systems and methods, such as those described herein, configured to provide a real-time novice method of detection and prevention pinch in stow path powered steering column (e.g., which may be broadly adopted to other similar product lines or products where pinch detection and prevention are required and which may include a long stow path power column, a medium stow path power column, or any suitable stow path power column), may be desirable. In some embodiments, the systems and methods described herein may be configured to detect, in real-time or near real-time, the telescope and tilt motor current and speed slew rate. The systems and methods described herein may be configured to, using at least, the slew rate, determine the pinch detection.

The systems and methods described herein may be configured to, in response to a pinch detection, provide a real-time algorithm, which immediately or substantially immediately stops or reverses the path of the steering column for a relatively short small period for calibration to determine pinch, which may assist the operator to avoid further injury.

The systems and methods described herein may be configured to detect a pinch in response to feedback current and speed slowly building-up, which is different from a hard stop of the column graph. The systems and methods described herein may be configured to determine the current and speed slew rate threshold for the powered steering column. The systems and methods described herein may be configured to detect the pinch event during the operation, by comparing the current and speed slew rate with the determined threshold criteria. The systems and methods described herein may be configured to, in response to the current and speed slew rate being equal to or exceeding the threshold, identify a pinch detection event. The systems and methods described herein may be configured to determine a prevention action, based on the pinch event being detected. The systems and methods described herein may be configured to continue operation, if a pinch event flag reset (e.g. responsive to determining that the pinch event has discontinued).

In some embodiments, the systems and methods described herein may be configured to provide pinch detection based on current and speed slew rate, which may allow for pinch detection as low as approximately 65 Newtons. The systems and methods described herein may be configured to detect valid pinch event, which may prevent pinch and not generate a false alarm, which may improve safety aspects of the vehicle. The systems and methods described herein may be configured to determine the slew rate of current and speed threshold based on multiple criteria and real-time learning.

In some embodiments, the systems and methods described herein may be configured to determine a current slew rate associated with a motor of the steering column. The systems and methods described herein may be configured to determine a speed slew rate associated with the motor. The systems and methods described herein may be configured to determine a current and speed slew rate threshold for the motor. The systems and methods described herein may be configured to determine the current and speed slew rate threshold based on a usage effect on motor current and speed, a temperature effect on motor current and speed, a power availability effect on motor current and speed, an initial current and speed slew rate learning, a power column current and speed offset due to parts variation, a real-time successful stow/unstow current and speed learning, and other suitable data, or a combination thereof.

The systems and methods described herein may be configured to determine whether at least one of the current slew rate and the speed slew rate indicates a pinch event based on a comparison of the current slew rate, the speed slew rate, and the current and speed slew rate threshold.

The systems and methods described herein may be configured to, in response to a determination that at least one of the current slew rate and the speed slew rate indicates a pinch event, selectively instruct the motor to one of stop operation and reverse operation for a calibration period. The systems and methods described herein may be configured to, in response to the pinch event having a magnitude that is less than a pinch event threshold, selectively instruct the motor to continue operation.

In some embodiments, the systems and methods described herein may be configured to, in response to a determination that the at least one of the current slew rate and the speed slew rate does not indicate a pinch event, selectively instruct the motor to continue operation. The systems and methods described herein may be configured to, in response to a determination that the pinch event has a magnitude that is greater than the pinch event threshold, selectively instruct the motor to discontinue operation and communicating a message to an operator of the vehicle.

Figure 1:
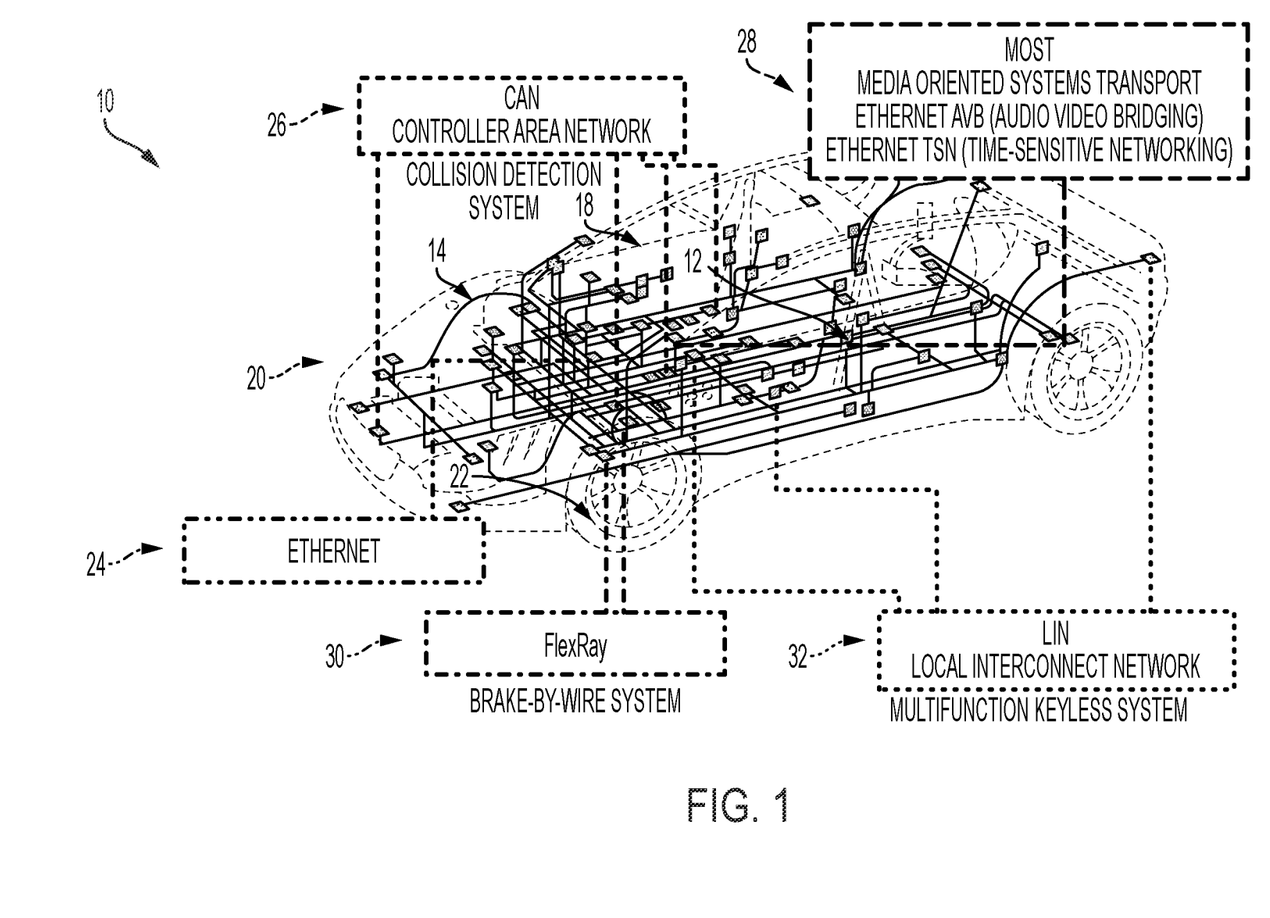
FIG. 1 generally illustrates a vehicle according to the principles of the present disclosure.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles.

The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

In some embodiments, the vehicle 10 may include a steering system, such as an EPS system, a steering-by-wire steering system (e.g., which may include or communicate with one or more controllers that control components of the steering system without the use of mechanical connection between the handwheel and wheels 22 of the vehicle 10), or other suitable steering system. The steering system may include an open-loop feedback control system or mechanism, a closed-loop feedback control system or mechanism, or combination thereof. The steering system may be configured to receive various inputs, including, but not limited to, a handwheel position, an input torque, one or more roadwheel positions, other suitable inputs or information, or a combination thereof. Additionally, or alternatively, the inputs may include a handwheel torque, a handwheel angle, a motor velocity, a vehicle speed, an estimated motor torque command, other suitable input, or a combination thereof. The steering system may be configured to provide steering function and/or control to the vehicle 10. For example, the steering system may generate an assist torque based on the various inputs. The steering system may be configured to selectively control a motor of the steering system using the assist torque to provide steering assist to the operator of the vehicle 10.

Figure 2:
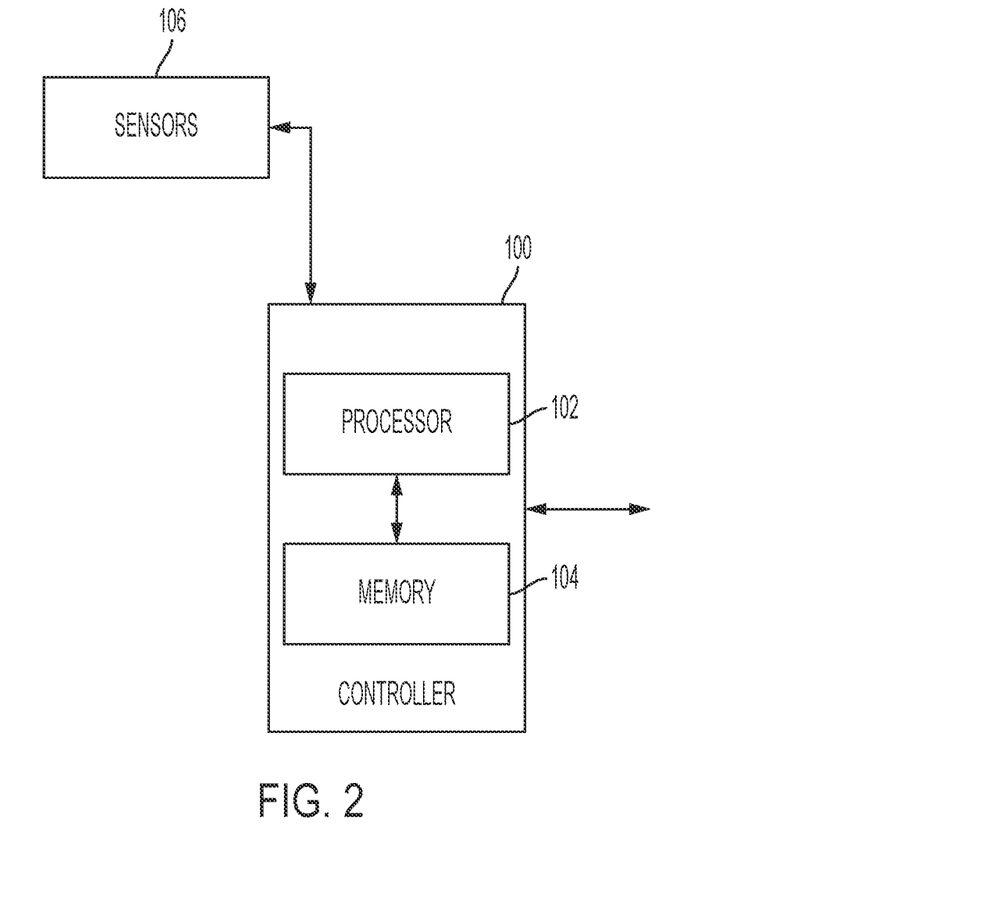
FIG. 2 generally illustrates a control system including a controller according to the principles of the present disclosure.

In some embodiments, the vehicle 10 may include a controller, such as controller 100, as is generally illustrated in FIG. 2. The controller 100 may include any suitable controller, such as an electronic control unit or other suitable controller. The controller 100 may be configured to control, for example, the various functions of the steering system and/or various functions of the vehicle 10. The controller 100 may include a processor 102 and a memory 104. The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various aspects of the vehicle 10.

The controller 100 may receive one or more signals from various measurement devices or sensors 106 indicating sensed or measured characteristics of the vehicle 10. The sensors 106 may include any suitable sensors, measurement devices, and/or other suitable mechanisms. For example, the sensors 106 may include one or more torque sensors or devices, one or more handwheel position sensors or devices, one or more motor position sensor or devices, one or more position sensors or devices, other suitable sensors or devices, or a combination thereof. The one or more signals may indicate a handwheel torque, a handwheel angel, a motor velocity, a vehicle speed, other suitable information, or a combination thereof.

In some embodiments, controller 100 may be configured to provide pinch detection for a steering column of the steering system of the vehicle 10. For example, the controller 100 may determine a current slew rate associated with a motor of the steering column. The controller 100 may determine a speed slew rate associated with the motor.

The controller 100 may determine a current and speed slew rate threshold for the motor. For example, the controller 100 may determine the current and speed slew rate threshold based on a usage effect on motor current and speed, a temperature effect on motor current and speed, a power availability effect on motor current and speed, an initial current and speed slew rate learning, a power column current and speed offset due to parts variation, a real-time successful stow/unstow current and speed learning, and other suitable data, or a combination thereof.

The controller 100 may determine whether the current slew rate or the speed slew rate indicates a pinch event based on a comparison of the current slew rate, the speed slew rate, and the current and speed slew rate threshold. For example, the current slew rate may indicate a pinch event when the current slew rate is greater than the current and speed slew rate threshold and the speed slew rate may indicate a pinch event when the speed slew rate is greater than the current and speed slew rate threshold.

The controller 100 may, in response to a determination that at least one of the current slew rate and the speed slew rate indicates a pinch event, selectively instruct the motor to one of stop operation and reverse operation for a calibration period. The controller 100 may, in response to the pinch event having a magnitude that is less than a pinch event threshold, selectively instruct the motor to continue operation.

In some embodiments, the controller 100 may, in response to a determination that the at least one of the current slew rate and the speed slew rate does not indicate a pinch event, selectively instruct the motor to continue operation. The controller 100 may, in response to a determination that the pinch event has a magnitude that is greater than the pinch event threshold, selectively instruct the motor to discontinue operation and communicating a message to an operator of the vehicle.

In some embodiments, the controller 100 may perform the methods described herein. However, the methods described herein as performed by the controller 100 are not meant to be limiting, and any type of software executed on a controller or processor can perform the methods described herein without departing from the scope of this disclosure. For example, a controller, such as a processor executing software within a computing device, can perform the methods described herein.

Figure 3:
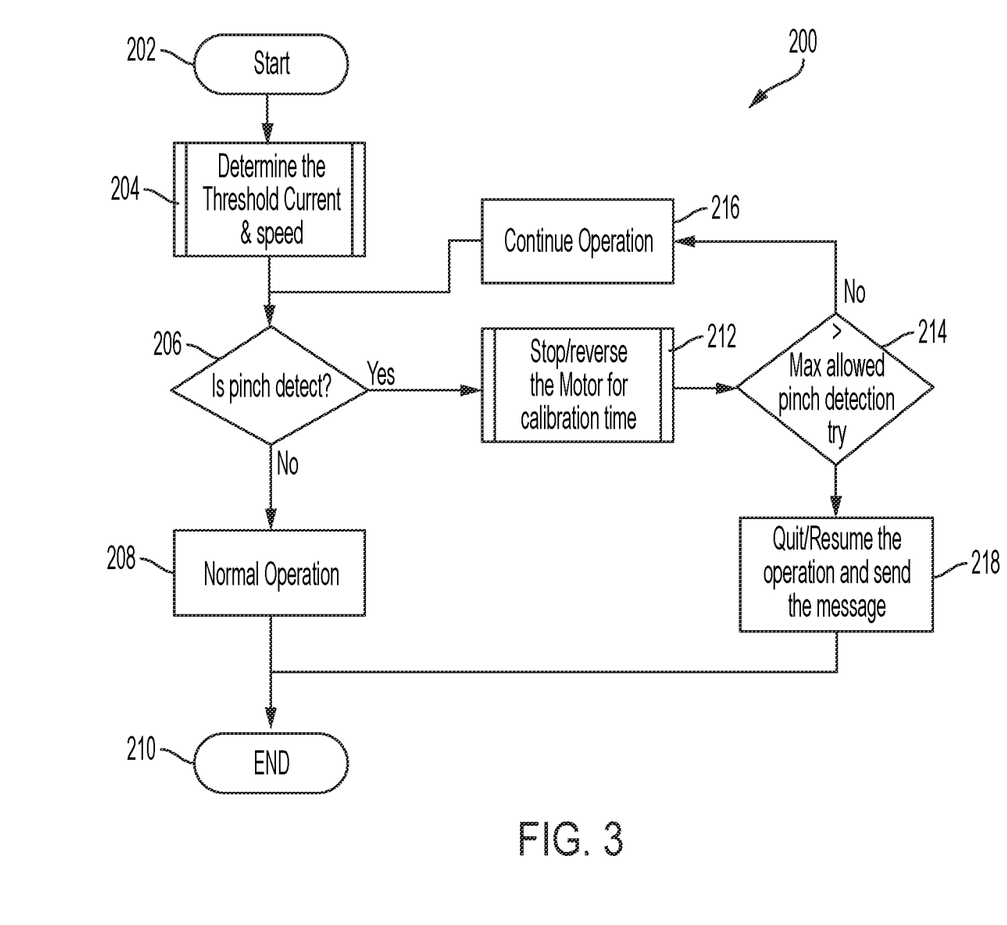
FIG. 3 is a flow diagram generally illustrating a pinch detection method according to the principles of the present disclosure.

FIG. 3 is a flow diagram generally illustrating a pinch detection method 200 according to the principles of the present disclosure. At 202, the method 200 starts. AT 204, the method 200 may determine the threshold current and speed. For example, the controller 100 may determine the current and speed threshold for the motor of the steering system of the vehicle 10.

At 206, the method 200 determines whether a pinch is detected. For example, the controller 100 may determine whether a pinch is detected. If the controller 100 determines a pinch is detected, the method 200 continues at 212. If the controller 100 determines that a pinch is not detected, the method 200 continues at 208.

At 208, the method 200 continues operation. For example, the controller 100 may instruct the motor to continue operation of the steering column (e.g., to continue to stow or unstow the steering column).

At 212, the method 200 stops and/or reverses the motor for a calibration period. For example, the controller 100 may instruct the motor to stop or reverse operation for a calibration period.

At 214, the method 200 determines whether the pinch detected is greater than or equal to a maximum allowed pinch detection. For example, the controller 100 determines whether the pinch detected is greater than or equal to a maximum allowed pinch detection. If the controller 100 determines the pinch is greater than or equal to the maximum allowed pinch, the method 200 continues at 218. If the controller 100 determines that the pinch detected is not greater than or equal to the maximum allowed pinch, the method 200 continues at 216.

At 216, the method 200 continues operation. For example, the controller 100 may instruct the motor to continue operation, as described.

At 218, the method 200 quits or resumes the operation and sends a message. For example, the controller 100 may quit or resume the operation of the steering column. The controller 100 may generate a message indicating the pinch detected and/or that operation has stopped or resumed. The controller 100 may communicate, via any suitable means or techniques, the message to the operator of the vehicle 10.

At 210, the method 200 ends.

Figure 4:
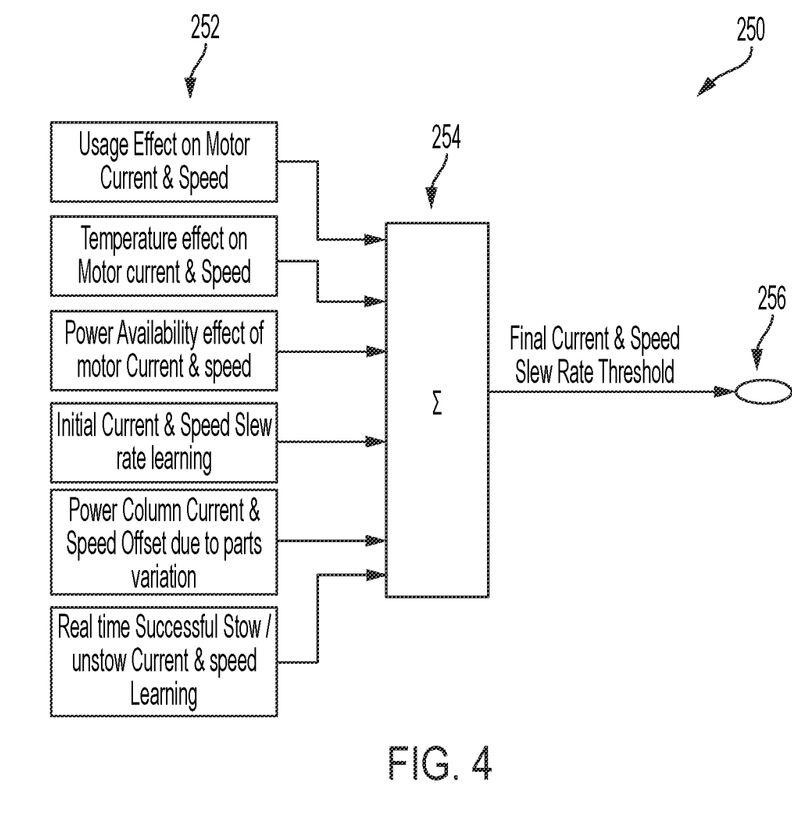
FIG. 4 is a flow diagram generally illustrating a threshold determination method according to the principles of the present disclosure.

FIG. 4 is a flow diagram generally illustrating a threshold determination method 250 according to the principles of the present disclosure. At 252, the method 200 receives various data. For example, the controller 100 may receive data corresponding to one or more of a usage effect on the motor current and speed, a temperature effect on the motor current and speed, a power availability effect on the motor current and speed, an initial current and speed slew rate learning, a power steering column current and speed offset due to parts variation, a real-tie successful stow/unstow current and speed learning, other suitable data, or a combination thereof.

At 254, the method 250 determines the current and speed slew rate threshold based on the various data. For example, the controller 100 may sum the various data, or perform other suitable operations on the various data, to determine the current and speed slew rate threshold.

At 256, the method 250 stores the final current and speed slew rate threshold. For example, the controller 100 may store the final current and speed slew rate threshold in a suitable memory.

Figure 5:
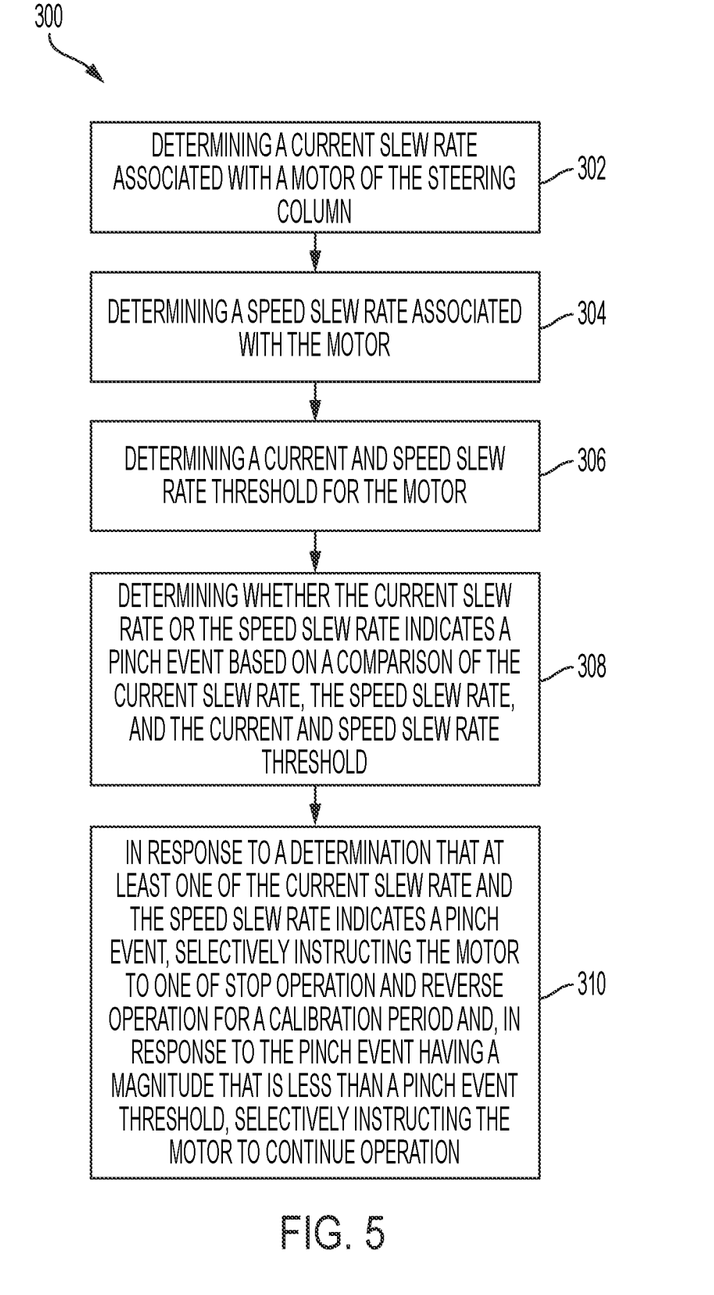
FIG. 5 is a flow diagram generally illustrating an alternative pinch detection method according to the principles of the present disclosure.

FIG. 5 is a flow diagram generally illustrating an alternative pinch detection method 300 according to the principles of the present disclosure. At 302, the method 300 determines a current slew rate associated with a motor of the steering column. For example, the controller 100 determines the current slew rate associated with the motor.

At 304, the method 300 determines a speed slew rate associated with the motor. For example, the controller 100 may determine the speed slew rate associated with the motor.

At 306, the method 300 may determine a current and speed slew rate threshold for the motor. For example, the controller 100 may determine the current and speed slew rate threshold for the motor.

At 308, the method 300 determines whether at least one of the current slew rate and the speed slew rate indicates a pinch event based on a comparison of the current slew rate, the speed slew rate, and the current and speed slew rate threshold. For example, the controller 100 may determine whether at least one of the current slew rate and the speed slew rate indicates a pinch event based on a comparison of the current slew rate, the speed slew rate, and the current and speed slew rate threshold.

At 310, the method 300, in response to a determination that at least one of the current slew rate and the speed slew rate indicates a pinch event, selectively instructs the motor to one of stop operation and reverse operation for a calibration period and, in response to the pinch event having a magnitude that is less than a pinch event threshold, selectively instructing the motor to continue operation. For example, the controller 100 may, in response to a determination that at least one of the current slew rate and the speed slew rate indicates a pinch event, selectively instructs the motor to one of stop operation and reverse operation for a calibration period and, in response to the pinch event having a magnitude that is less than a pinch event threshold, selectively instructing the motor to continue operation.

In some embodiments, a method for pinch detection of a steering column of a vehicle includes determining a current slew rate associated with a motor of the steering column, determining a speed slew rate associated with the motor, determining a current and speed slew rate threshold for the motor, and determining whether the current slew rate or the speed slew rate indicates a pinch event based on a comparison of the current slew rate, the speed slew rate, and the current and speed slew rate threshold. The method also includes, in response to a determination that at least one of the current slew rate and the speed slew rate indicates a pinch event, selectively instructing the motor to one of stop operation and reverse operation for a calibration period and, in response to the pinch event having a magnitude that is less than a pinch event threshold, selectively instructing the motor to continue operation.

In some embodiments, the method also includes, in response to a determination that neither of the current slew rate and the speed slew rate indicates a pinch event, selectively instructing the motor to continue operation. In some embodiments, the method also includes, in response to a determination that the pinch event has a magnitude that is greater than the pinch event threshold, selectively instructing the motor to discontinue operation and communicating a message to an operator of the vehicle. In some embodiments, the steering column is associated with an electronic power steering system. In some embodiments, the steering column is associated with a steer-by-wire steering system. In some embodiments, the vehicle includes one of an autonomous vehicle and a semi-autonomous vehicle. In some embodiments, the current and speed slew rate threshold is based on at least one of a usage effect on motor current and speed, a temperature effect on motor current and speed, a power availability effect on motor current and speed, an initial current and speed slew rate learning, a power column current and speed offset due to parts variation, and a real-time successful stow/unstow current and speed learning. In some embodiments, the current slew rate indicates a pinch event in response to the current slew rate being greater than the current and speed slew rate threshold and the speed slew rate indicates a pinch event in response to the speed slew rate being greater than the current and speed slew rate threshold.

In some embodiments, a system for pinch detection of a steering column of a vehicle includes a processor and a memory. The memory includes instructions that, when executed by the processor, cause the processor to: determine a current slew rate associated with a motor of the steering column; determine a speed slew rate associated with the motor; determine a current and speed slew rate threshold for the motor; determine whether the current slew rate or the speed slew rate indicates a pinch event based on a comparison of the current slew rate, the speed slew rate, and the current and speed slew rate threshold; and, in response to a determination that at least one of the current slew rate and the speed slew rate indicates a pinch event, selectively instruct the motor to one of stop operation and reverse operation for a calibration period and, in response to the pinch event having a magnitude that is less than a pinch event threshold, selectively instruct the motor to continue operation.

In some embodiments, the instructions further cause the processor to, in response to a determination that neither of the current slew rate and the speed slew rate indicates a pinch event, selectively instruct the motor to continue operation. In some embodiments, the instructions further cause the processor to, in response to a determination that the pinch event has a magnitude that is greater than the pinch event threshold, selectively instruct the motor to discontinue operation and communicating a message to an operator of the vehicle. In some embodiments, the steering column is associated with an electronic power steering system. In some embodiments, the steering column is associated with a steer-by-wire steering system. In some embodiments, the vehicle includes one of an autonomous vehicle and a semi-autonomous vehicle. In some embodiments, the current and speed slew rate threshold is based on at least one of a usage effect on motor current and speed, a temperature effect on motor current and speed, a power availability effect on motor current and speed, an initial current and speed slew rate learning, a power column current and speed offset due to parts variation, and a real-time successful stow/unstow current and speed learning. In some embodiments, the current slew rate indicates a pinch event in response to the current slew rate being greater than the current and speed slew rate threshold and the speed slew rate indicates a pinch event in response to the speed slew rate being greater than the current and speed slew rate threshold.

In some embodiments, an apparatus for pinch detection of a steering column of a vehicle includes a processor and a memory. The memory includes instructions that, when executed by the processor, cause the processor to: determine a current slew rate associated with a motor of the steering column; determine a speed slew rate associated with the motor; determine a current and speed slew rate threshold for the motor; determine whether the current slew rate or the speed slew rate indicates a pinch event based on a comparison of the current slew rate, the speed slew rate, and the current and speed slew rate threshold; in response to a determination that neither of the current slew rate and the speed slew rate indicates a pinch event, selectively instruct the motor to continue operation; and, in response to a determination that at least one of the current slew rate and the speed slew rate indicates a pinch event: selectively instruct the motor to one of stop operation and reverse operation for a calibration period; in response to the pinch event having a magnitude that is less than a pinch event threshold, selectively instruct the motor to continue operation; and, in response to a determination that the pinch event has a magnitude that is greater than the pinch event threshold, selectively instruct the motor to discontinue operation and communicating a message to an operator of the vehicle.

In some embodiments, the steering column is associated with an electronic power steering system. In some embodiments, the steering column is associated with a steer-by-wire steering system. In some embodiments, the current and speed slew rate threshold is based on at least one of a usage effect on motor current and speed, a temperature effect on motor current and speed, a power availability effect on motor current and speed, an initial current and speed slew rate learning, a power column current and speed offset due to parts variation, and a real-time successful stow/unstow current and speed learning.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for pinch detection of a steering column of a vehicle, the method comprising:
   determining a current slew rate associated with a motor of the steering column;
   determining a speed slew rate associated with the motor;
   determining a current and speed slew rate threshold for the motor, wherein the current and speed slew rate threshold is based on a usage effect on motor current and speed, and at least one of a temperature effect on motor current and speed, a power availability effect on motor current and speed, an initial current and speed slew rate learning, a power column current and speed offset due to parts variation, and a real-time successful stow/unstow current and speed learning;

determining whether the current slew rate or the speed slew rate indicates a pinch event based on a comparison of the current slew rate, the speed slew rate, and the current and speed slew rate threshold; and in response to a determination at least one of the current slew rate and the speed slew rate indicates a pinch event:

selectively instructing the motor to one of stop operation and reverse operation for a calibration period; and in response to the pinch event having a magnitude that is less than a pinch event threshold, selectively instructing the motor to continue operation.

2. The method of claim 1, further comprising, in response to a determination neither of the current slew rate and the speed slew rate indicates a pinch event, selectively instructing the motor to continue operation.

3. The method of claim 1, further comprising, in response to a determination that the pinch event has a magnitude that is greater than the pinch event threshold, selectively instructing the motor to discontinue operation and communicating a message to an operator of the vehicle.

4. The method of claim 1, wherein the steering column is associated with an electronic power steering system.

5. The method of claim 1, wherein the steering column is associated with a steer-by-wire steering system.

6. The method of claim 1, wherein the vehicle includes one of an autonomous vehicle and a semi-autonomous vehicle.

7. The method of claim 1, wherein the current slew rate indicates a pinch event in response to the current slew rate being greater than the current and speed slew rate threshold and the speed slew rate indicates a pinch event in response to the speed slew rate being greater than the current and speed slew rate threshold.

8. A system for pinch detection of a steering column of a vehicle, the system comprising:

a processor; and a memory including instructions that, when executed by the processor, cause the processor to:

determine a current slew rate associated with a motor of the steering column;

determine a speed slew rate associated with the motor;

determine a current and speed slew rate threshold for the motor, wherein the current and speed slew rate threshold is based on a usage effect on motor current and speed, and at least one of a temperature effect on motor current and speed, a power availability effect on motor current and speed, an initial current and speed slew rate learning, a power column current and speed offset due to parts variation, and a real-time successful stow/unstow current and speed learning;

determine whether the current slew rate or the speed slew rate indicates a pinch event based on a comparison of the current slew rate, the speed slew rate, and the current and speed slew rate threshold; and in response to a determination that at least one of the current slew rate and the speed slew rate indicates a pinch event:

selectively instruct the motor to one of stop operation and reverse operation for a calibration period; and in response to the pinch event having a magnitude that is less than a pinch event threshold, selectively instruct the motor to continue operation.

9. The system of claim 8, wherein the instructions further cause the processor to, in response to a determination that neither of the current slew rate and the speed slew rate indicates a pinch event, selectively instruct the motor to continue operation.

10. The system of claim 8, wherein the instructions further cause the processor to, in response to a determination that the pinch event has a magnitude that is greater than the pinch event threshold, selectively instruct the motor to discontinue operation and communicating a message to an operator of the vehicle.

11. The system of claim 8, wherein the steering column is associated with an electronic power steering system.

12. The system of claim 8, wherein the steering column is associated with a steer-by-wire steering system.

13. The system of claim 8, wherein the vehicle includes one of an autonomous vehicle and a semi-autonomous vehicle.

14. The system of claim 8, wherein the current slew rate indicates a pinch event in response to the current slew rate being greater than the current and speed slew rate threshold and the speed slew rate indicates a pinch event in response to the speed slew rate being greater than the current and speed slew rate threshold.

15. An apparatus for pinch detection of a steering column of a vehicle, the apparatus comprising:

a processor; and a memory including instructions that, when executed by the processor, cause the processor to:

determine a current slew rate associated with a motor of the steering column;

determine a speed slew rate associated with the motor;

determine a current and speed slew rate threshold for the motor, wherein the current and speed slew rate threshold is based on a usage effect on motor current and speed, and at least one of a temperature effect on motor current and speed, a power availability effect on motor current and speed, an initial current and speed slew rate learning, a power column current and speed offset due to parts variation, and a real-time successful stow/unstow current and speed learning;

determine whether the current slew rate or the speed slew rate indicates a pinch event based on a comparison of the current slew rate, the speed slew rate, and the current and speed slew rate threshold;

in response to a determination that neither of the current slew rate and the speed slew rate indicates a pinch event, selectively instruct the motor to continue operation; and in response to a determination that at least one of the current slew rate and the speed slew rate indicates a pinch event:

selectively instruct the motor to one of stop operation and reverse operation for a calibration period;

in response to the pinch event having a magnitude that is less than a pinch event threshold, selectively instruct the motor to continue operation; and in response to a determination that the pinch event has a magnitude that is greater than the pinch event threshold, selectively instruct the motor to discontinue operation and communicating a message to an operator of the vehicle.

16. The apparatus of claim 15, wherein the steering column is associated with an electronic power steering system.

17. The apparatus of claim 15, wherein the steering column is associated with a steer-by-wire steering system.

\* \* \* \* \*